United States Patent
Speller, III et al.

(10) Patent No.: US 10,331,424 B1
(45) Date of Patent: Jun. 25, 2019

(54) USER INTERFACE DEVELOPMENT THROUGH WEB SERVICE DATA DECLARATIONS

(71) Applicant: Modo Labs, Inc., Cambridge, MA (US)

(72) Inventors: Thomas Hughes Speller, III, Wakefield, MA (US); Brian Lawrence Patt, Cambridge, MA (US); Peter Eugene Akins, Belmont, MA (US)

(73) Assignee: Modo Labs, Inc., Cambridge, MA (US)

( * ) Notice: Subject to any disclaimer, the term of this patent is extended or adjusted under 35 U.S.C. 154(b) by 0 days.

(21) Appl. No.: 16/047,523

(22) Filed: Jul. 27, 2018

(51) Int. Cl.
*G06F 3/048* (2013.01)
*G06F 8/38* (2018.01)
*G06F 9/451* (2018.01)
*G06F 3/0481* (2013.01)
*G06F 16/951* (2019.01)

(52) U.S. Cl.
CPC .............. *G06F 8/38* (2013.01); *G06F 3/0481* (2013.01); *G06F 9/451* (2018.02); *G06F 16/951* (2019.01)

(58) Field of Classification Search
None
See application file for complete search history.

(56) References Cited

U.S. PATENT DOCUMENTS

| | | | |
|---|---|---|---|
| 8,225,271 B2 | 7/2012 | Eldridge et al. | |
| 8,230,390 B2 | 7/2012 | Koster | |
| 8,402,555 B2 * | 3/2013 | Grecia | H04L 9/3234 713/185 |
| 8,601,433 B2 | 12/2013 | Son et al. | |
| 8,789,022 B2 | 7/2014 | Neogi | |
| 8,887,132 B1 * | 11/2014 | Hunter | G06F 9/44505 717/111 |
| 9,753,747 B2 | 9/2017 | Offenhartz et al. | |
| 10,073,761 B2 | 9/2018 | Kidron et al. | |
| 2002/0049788 A1 * | 4/2002 | Lipkin | G06F 16/972 715/236 |
| 2004/0046789 A1 * | 3/2004 | Inanoria | G06F 8/38 715/748 |
| 2004/0268228 A1 * | 12/2004 | Croney | G06F 16/958 715/255 |
| 2006/0123344 A1 | 6/2006 | Volkov et al. | |
| 2007/0239749 A1 * | 10/2007 | Farahbod | G06F 17/2725 |
| 2007/0277109 A1 * | 11/2007 | Chen | G06F 8/20 715/733 |
| 2010/0037206 A1 * | 2/2010 | Larimore | G06F 16/188 717/109 |
| 2011/0246961 A1 | 10/2011 | Tripathi | |

(Continued)

OTHER PUBLICATIONS

C. Kohlschutter, A densitometric analysis of web template content, Apr. 2009, 2 pages.

(Continued)

*Primary Examiner* — Hua Lu
(74) *Attorney, Agent, or Firm* — Goodwin Procter LLP

(57) ABSTRACT

Dynamic user interfaces modules are configured to communicate with a web service that provides, through HTTP requests and responses, JavaScript Object Notation objects declaring instances of user interface elements according to a predefined specification. The dynamic user interface modules render the instances in accordance with the JSON objects received from the web service and the properties defined for each user interface element declared thereby.

20 Claims, 8 Drawing Sheets

(56) References Cited

U.S. PATENT DOCUMENTS

| | | | | |
|---|---|---|---|---|
| 2012/0026081 A1* | 2/2012 | Kompalli | ............... | G06F 8/34 |
| | | | | 345/156 |
| 2014/0068549 A1* | 3/2014 | Friedman | ............... | G06F 8/30 |
| | | | | 717/104 |
| 2014/0298419 A1* | 10/2014 | Boubez | ............... | H04L 63/08 |
| | | | | 726/4 |
| 2016/0062954 A1* | 3/2016 | Ruff | ............... | G06F 17/21 |
| | | | | 715/249 |
| 2016/0349949 A1* | 12/2016 | Miller | ............... | G06F 3/0482 |
| 2017/0185395 A1* | 6/2017 | Arians | ............... | G06F 8/71 |
| 2017/0324719 A1* | 11/2017 | Mason | ............... | H04L 63/08 |
| 2018/0275881 A1 | 9/2018 | Ashraf et al. | | |

OTHER PUBLICATIONS

Cazoulat et al., A template based production chain: using richmedia templates to assist users during content production, Aug. 2007, 3 pages.

Himura et al., Discovering configuration templates of virtualized tenant networks in multi-tenancy datacenters via graph-mining, Jun. 2012, 8 pages.

Smarty3 Manual, New Digital Group, Inc., Nov. 2010, 285 pages.

\* cited by examiner

USER INTERFACE DEVELOPMENT THROUGH WEB SERVICE DATA DECLARATIONS

FIELD OF THE INVENTION

The present disclosure relates generally to user interfaces, and, more specifically, to systems and methods for enabling the development of custom user interfaces using web services.

BACKGROUND

Delivering mobile web and native applications tailored to different classes of target devices is a challenging endeavor. In many cases, developers must write separate code for each target platform and include device-specific code for each device. To address these challenges, some service providers offer user interface modules that are compatible with multiple platforms. However, successful implementation of these modules generally requires programming knowledge and skills that are specific to the service provider's platform, in order to connect an external data source to the user interface modules and perform any necessary data translation and mappings.

BRIEF SUMMARY

In one aspect, a computer-implemented method for user interface development comprises providing a specification that defines a format for declaring data to be displayed within a plurality of user interface elements; receiving by a dynamic user interface module, through a web service programmed to conform to the specification, one or more objects declaring instances of one or more of the user interface elements; and rendering for display to a user by the dynamic user interface module, based on the received one or more objects, the instances of the one or more user interface elements. Other aspects of the foregoing include corresponding computer systems and computer-executable instructions stored on non-transitory storage media.

Various implementations of the foregoing aspects can include one or more of the following features. The dynamic user interface module can be configured to communicate with the web service via a specified uniform resource locator. The dynamic user module can query the web service using an HTTP request. In response to the HTTP request, the HTTP response comprising the one or more objects can be received from the web service. The dynamic user interface module can include a standalone application executing on an underlying platform. The dynamic user interface module can include a user interface module disposed within a separate application executing on an underlying platform. The dynamic user interface module can be disposed with a header or a footer of a screen of the separate application. The dynamic user interface module can be disposed within one or more components of a user interface, which user interface can further include other components created independently of the dynamic user interface module. The one or more objects can include JavaScript Object Notation objects. Each object can include one or more fields of one of the user interface elements, and rendering the instances can include configuring properties of the instances of the user interface elements based on the fields. A token can be used to form a trusted relationship between the dynamic user interface module and the web service, as well as deliver metadata associated with a user, the user's device, and/or the dynamic user interface module.

The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings.

DETAILED DESCRIPTION

Figure 1:
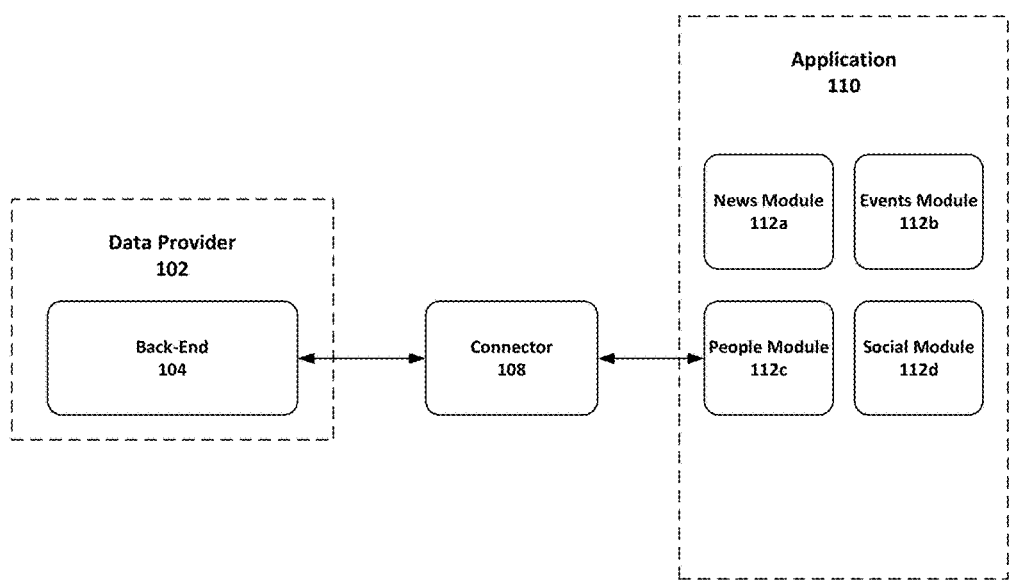
FIG. 1 depicts a high-level architecture of a traditional system for providing user interface modules.

Described herein are methods and supporting systems for enabling the development of custom user interfaces using web services that conform to a specification. FIG. 1 depicts a traditional system in which the back-end 104 of a data provider 102 integrates with predefined user interface modules 112a-112d within an application 110, such as a web browser or a native mobile application. In one implementation, the user interface modules 112a-112d include modules made available through the mobile interface development platform provided by MODO LABS, INC. of Cambridge, Mass. The integration is accomplished using a connector software component (connector) 108 that retrieves data from the back-end 104 and maps the data to elements in the user interface modules 112a-112d. For example, back-end 104 can include a database of student information, and data items such as student name, address, and age can be retrieved from the back-end 104 by connector 108 and mapped into a user interface module that displays the student information, such as People Module 112c. In order to ensure that the data provider 102 can properly integrate with the user interface modules 112a-112d in the platform application 110, the developer of the connector 108 must have intimate knowledge of how the modules 112a-112d are constructed. As such, it is necessary for the provider of the modules 112a-112d also to be responsible for developing the connector 108, which places additional burdens on the module provider and limits the data provider's ability to independently change the use of user interface modules within the application 110.

Figure 2:
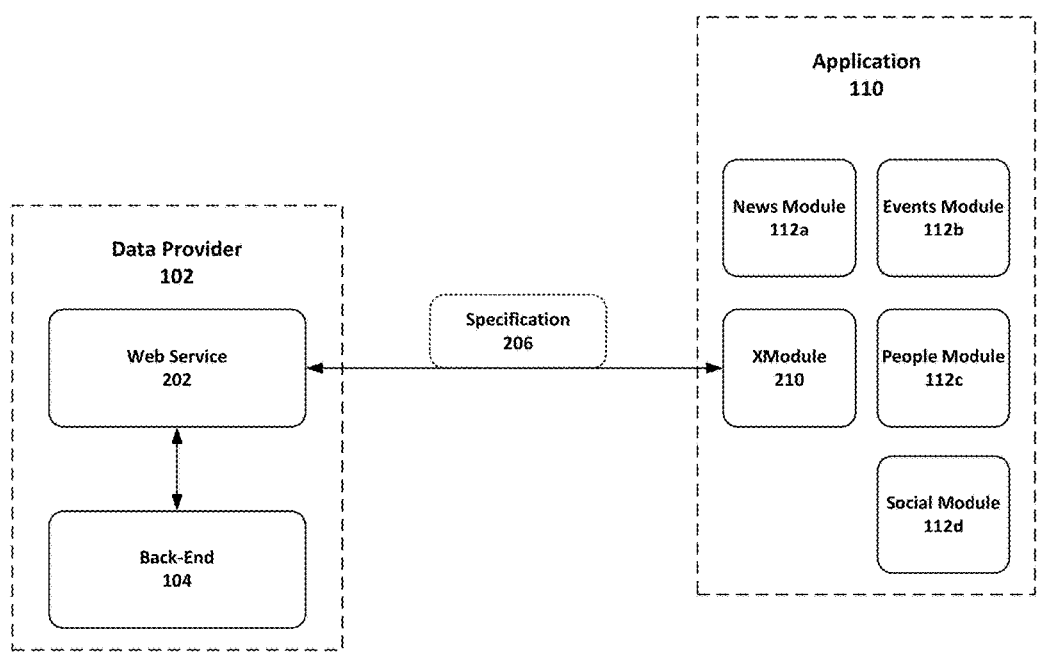
FIG. 2 depicts a high-level architecture of a system for providing and configuring dynamic user interface modules.

With reference to FIG. 2, an improvement to the system depicted in FIG. 1 will now be described. As shown, a custom-developed connector between the back-end 104 and the user interface modules 112*a*-112*d* in application 110 is no longer required. Instead, three new components are depicted that together enable the configuration and data population of predefined user interface modules within application 110, without the need for a connector that retrieves data and maps the data to user interface elements. First, a specification 206 is provided that documents the types of user interface elements, as embodied in modules, that are available, and the format for declaring each element and the individual items of data that it supports. For example, a "list" user interface element can be defined to include a collection of individual list elements. Next, a web service 202 (e.g., an application programming interface ("API") over a web protocol, such as HTTP) that conforms to the specification 206 is connected to the back-end 104 of the data provider 102. More specifically, the web service 104 is able to retrieve data from the back-end 104 and communicate the data in a format defined by the specification 206. In one implementation, the web service 104 is a JavaScript Object Notation ("JSON")-based web service, which communicates data from the back-end 104 as JSON objects. In some instances, the web service 202 is developed by the data provider 102, who may have better knowledge of how data is stored and can be accessed on the back-end 104. On the application 110 side, a dynamic user interface module, referred to here as an "XModule" 210, automatically renders data received from the web service 202 that conforms to the specification 206. The XModule 210 can query the web service 104 for data using any suitable technique. For example, the XModule 210 can make HTTP-based requests (e.g., GET or POST) to the web service 104, which returns an HTTP response. In some implementations, there are one or more web services that communicate with one or more XModules. For example, a second web service can retrieve data from a second back-end and communicate the data in a form meeting the specification 206 to the XModule 210 and/or other XModule instances. As previously mentioned, the XModule 210 can render data received from the web service 202. In particular, the XModule 210 can render a user interface that corresponds to user interface elements defined in the received data. Advantageously, although generally referred to as a module herein, the XModule 210 can be an individual module and render one or more user interface elements within a separate application or, in other instances, the XModule 210 itself can be an application that provides one or more user interface elements. In one implementation, the XModule 210 provider makes an underlying platform available that allows the XModule 210 to execute as either a standalone application or as a module within another application. Such a platform can include, for example, the mobile interface development platform provided by MODO LABS, INC. of Cambridge, Mass.

Figure 3:
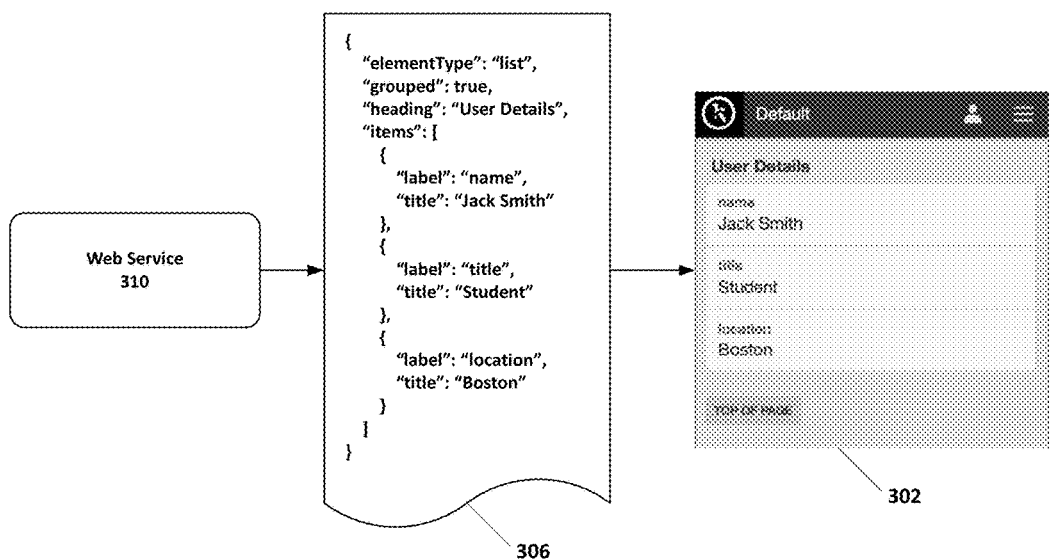
FIG. 3 depicts an example dynamic user interface module rendering a user interface element from a web service response.

FIG. 3 depicts one example of an XModule 302 rendering JSON data 306 provided by a web service 310 upon the XModule 302 querying the web service 310. Here, the XModule 302 is a user interface module that displays a user profile, with individual data items in the profile being shown in a list format. The JSON data 306 defines the "list" user interface element type, which indicates that the corresponding XModule 302 should render a predefined list user interface module. In addition to setting the "grouped" and "heading" properties, the JSON data 306 for the list includes an array of list "items," with each item having a declared "label" data value and corresponding "title" value. In some implementations, the visual properties (e.g., color, layout, font, etc.) of the XModule 302 are configurable by the web service 310 through particular declarations included in the JSON data 306. In further implementations, the visual properties of the XModule 302 are configured to adapt to the particular platform on which the XModule 302 is displayed. For example, the XModule 302 can be rendered differently depending on whether a user is viewing an application or webpage using the XModule 302 on a smartphone vs. a tablet, or an Android-based device vs, an iOS-based device, for example. Techniques for adapting user interface components to different platforms and devices are described in U.S. Pat. No. 9,015,657, issued on Apr. 21, 2015, and entitled "Systems and Methods for Developing and Delivering Platform Adaptive Web and Native Application Content," the entirety of which is incorporated by reference herein.

Figure 4:
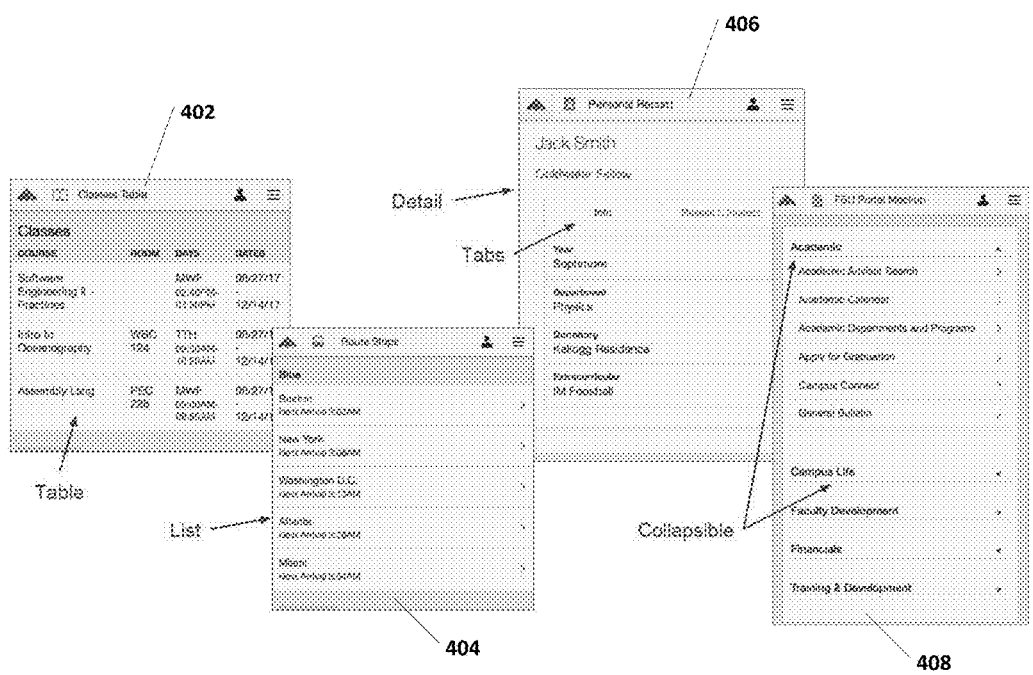
FIG. 4 depicts various examples of dynamic user interface modules rendering different user interface elements.

FIG. 4 illustrates additional elements of XModule user interface modules. XModule 402 depicts a class schedule using a table user interface element. XModule 404 depicts a transit schedule using a list user interface element. XModule 406 shows a personal record for a student with tab user interface elements to allow a user to alternate between different sets of information (i.e., student info and research interests). XModule 408 depicts a university portal page with collapsible list user interface elements. One of skill in the art will appreciate that various user interface elements that can be included in an XModule, including but not limited to buttons, text areas, multicolumn and multirow formats, images, videos, formatted text, entry fields, sliders, scroll bars, radio buttons, checkboxes, drop-down boxes, forms, calendars, maps, links, portlets, social media feeds, share buttons, and the like.

Figure 5:
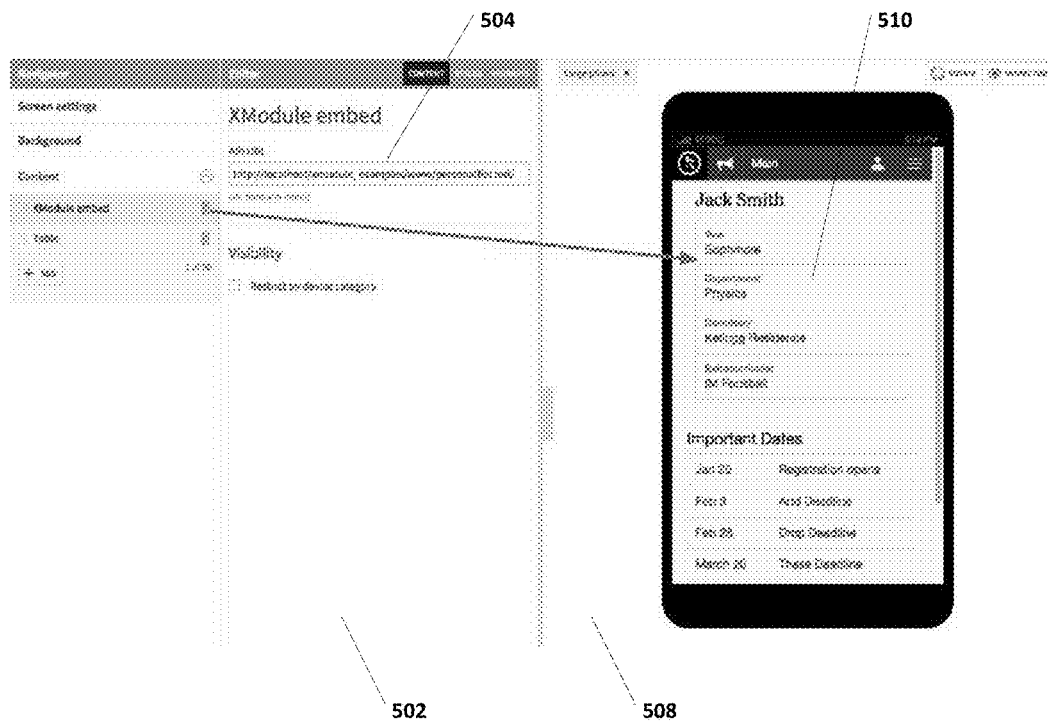
FIG. 5 depicts an example interface screen for configured a web service for a dynamic user interface module.

FIG. 5 depicts an example graphical user interface for embedding an XModule into an application. The editor pane 502 includes an API uniform resource locator ("URL") field 504 where a user can specify the hosting location of the web service that will provide data to the XModule. The preview pane 508 includes a preview 510 of the XModule as it will appear on a particular device or platform, such as a smartphone with a large screen, as depicted. As shown in FIG. 5, the preview 510 of the XModule includes a list user interface element composed of data items (year, department, dormitory, and extracurricular activities) associated with a particular student. These data items can be automatically populated in the preview 510 using a response (e.g., JSON response) obtained from querying the web service specified in the API URL field 504.

Implementations of the web service (e.g., web service 202 in FIG. 2) will now be described in further detail. The web service can be an API provided over any suitable network protocol, such as Hypertext Transfer Protocol ("HTTP") or HTTP Secure ("HTTPS"). In one implementation, the web service is an HTTP-based web service that responds to GET and POST requests from an XModule. Unless an error occurs or an invalid request is received, the web service responds in JSON, including a declaration of which user interface elements to display. The response is returned with an HTTP status code of 200 (OK), indicating that the response is acceptable to be rendered by the requesting XModule. An example request to https://api.example.com is as follows:

Request:
GET/HTTP/1.1
Host: api.example.com
Authorization: Bearer <token>

An example response, without content, is as follows:
Response:
HTTP/1.1 200 OK
Content-Type: application/json
Content-Length: 71
```
{
   "metadata": {
      "version": "1"
   },
   "content": [
   ]
}
```

The web service response includes two root elements: metadata and content. The metadata element is an object container for metadata, such as the version of the XModule specification that the web service is using. The content element is an array container for user interface elements. Each user interface element is declared as an individual item in the array. Several examples of user interface elements that can be declared by the web service within the JSON content element will now be described in the following tables and accompanying text, although it is to be appreciated that various user interface element types are contemplated. An XModule receiving declared user interface elements through the web service can render the elements in accordance with their declared fields and associated properties.

A "list" user interface element is a list of items to be displayed.

| Field | Type | Description |
| --- | --- | --- |
| elementType | string | For a list element this field is "list". |
| heading | string | Displays a heading above the list. |
| grouped | boolean | A display style that can be used when strong visual separation between this list and other major elements of the screen is required; defaults to false. |
| items | array | A container of item objects (see below). |

The items array in a list element can include objects of type "item", which are elements contained within the list.

| Field | Type | Description |
| --- | --- | --- |
| title | string | The title of the item. |
| label | string | A label which appears above the item's title. |
| description | string | A subtitle that is displayed between the item's title and content. |
| link | object | Setting this field turns the item into a link that can be interacted with. |
| thumbnail | object | An image displayed to the left of the item's text fields. |

As shown in the above table, an item object can include a "thumbnail" object, which is an image displayed next to the item's text fields.

| Field | Type | Description |
| --- | --- | --- |
| url | string | The URL for the image. |
| maxWidth | number | An integer indicating the maximum width of the image in pixels. |
| maxHeight | number | An integer indicating the maximum height of the image in pixels. |
| crop | boolean | A false value maintains the image's original aspect ratio; a true value will scale the image to meet the max setting for at least one dimension (width or height) and then crop the other dimension as needed; defaults to false. |
| Alt | string | Alternate text for accessibility purposes. |

Example JSON produced by a web service for a list element is as follows:

```
{
   "elementType": "list",
   "grouped": true,
   "heading": "Example heading",
   "items": [
      {
         "label": "Example label",
         "title": "Example title",
         "description": "Example description"
      },
      {
         "title": "Example title with link",
         "link": {
            "relativePath": "?page=example_link",
            "accessoryIcon": "plus"
         },
         "thumbnail": {
            "url": "http://static.modolabs.com/services/modo.png",
            "maxWidth": 43,
            "maxHeight": 43,
            "crop": true,
            "alt": "Modo Labs"
         }
      }
   ]
}
```

An "image" user interface element enables input of an image from an external URL.

| Field | Type | Description |
| --- | --- | --- |
| elementType | string | For an image element this field is "image". |
| url | string | A URL to a hosted image. |
| alt | string | Alternate text for accessibility purposes. |
| scaleToFull | boolean | If true, will scale the image to the full width of the enclosing element; defaults to false. |

Example JSON produced by a web service for an image element is as follows:

```
{
   "elementType": "image",
   "url": "https://upload.wikimedia.org/wikipedia/commons/a/a5/Example_svg.svg"
}
```

A "linkButton" user interface element is a button intended for linking the user to another page. Buttons are displayed in a "buttonContainer" element.

| Field | Type | Description |
| --- | --- | --- |
| elementType | string | For a linkButton element this field is "linkButton". |
| title | string | The text displayed within the linkButton. |
| link | object | Link object (see below). |
| disabled | boolean | When set to true, the linkButton element is grayed out and cannot be interacted with (e.g., untappable). |

-continued

| Field | Type | Description |
| --- | --- | --- |
| accessoryIconPosition | string | If the "link" has an "accessoryIcon" set, this field controls the relative positioning of the icon; allowed values are "left" and "right"; defaults to "left". |
| actionType | string | Sets the style of the button to indicate what kind of action it performs; allowed values are "constructive", "destructive", and "emphasized". |

Example JSON produced by a web service for a linkButton element nested within a buttonContainer element is as follows:

```
{
   "elementType": "buttonContainer",
   "buttons": [
      {
         "elementType": "linkButton",
         "title": "Button Title",
         "link": {
            "external": "http://www.example.com",
            "accessoryIcon": "drilldown"
         },
         "accessoryIconPosition": "right"
      }
   ]
}
```

A "buttonContainer" element is used as a wrapper for button elements. Buttons that are wrapped inside the same buttonContainer can be displayed inline.

| Field | Type | Description |
| --- | --- | --- |
| elementType | string | For a buttonContainer element this field is "buttonContainer". |
| buttons | array | An container for one or more buttons. |

Example JSON produced by a web service for a buttonContainer element is as follows:

```
{
   "elementType": "buttonContainer",
   "buttons": [
      {
         "elementType": "linkButton",
         "title": "Constructive",
         "link": {
            "external": "http://www.example.com"
         },
         "actionType": "constructive"
      },
      {
         "elementType": "linkButton",
         "title": "Destructive",
         "link": {
            "external": "http://www.example.com"
         },
         "actionType": "destructive"
      },
      {
         "elementType": "linkButton"
         , "title": "Emphasized",
         "link": {
            "external": "http://www.example.com"
         },
         "actionType": "emphasized"
      }
   ]
}
```

A "portlet" element is a type of container that can be used to distinguish content as being from a different source than other content in the page.

| Field | Type | Description |
| --- | --- | --- |
| elementType | string | For a portlet element this field is "portlet". |
| navbarTitle | string | The title of the portlet. |
| navbarIcon | string | An icon specified from a set of icons configured in for a particular theme. |
| navbarLink | object | Link object (see below). |
| content | array | A container for other element types that can be displayed within the portlet's content area. |
| height | string | The height can be one of the following values: "auto", "small", "medium", "large", "xlarge". The default value is "auto". |

Example JSON produced by a web service for a portlet element is as follows:

```
{
"elementType": "portlet",
"navbarTitle": "Portlet Title",
"navbarIcon": "fullweb", "content": [ ]
}
```

A "link" object indicates the type of page to which a user will be taken when they interact with a user interface element's link. The link type is set as a field within the link object, and can include one of the following.

| Field | Type | Description |
| --- | --- | --- |
| relativePath | string | A link type used for linking to a page in the same XModule instance. Example JSON: "relativePath": "?page=example_link". |
| external | string | A link type that accepts a URL to an external web page. Example JSON: "external": "https://www.wikipedia.org". |
| module | object | A link type used for linking to a page in another user interface module. |
| xmodule | object | A link type used for linking to a page in another XModule instance. |

The "module" link type is an object that accepts the below fields. This link type can be used for linking to any other module that has been configured within the same application.

| Field | Type | Description |
| --- | --- | --- |
| id | string | The id (or path) of the module to link to. |
| page | string | A specific page within the module; if not specified this will default to the module's index page. |
| queryParameters | object | An object containing key/value pairs that represent parameters in the link's query string. |

Example JSON produced by a web service for a link element of type "module" is as follows:

```
"link": {
"module": {
   "id": "map",
   "page": "search",
   "queryParameters": {
      "search": "Search",
      "filter": "theater"
   }
}
}
```

The "xmodule" link type is used to link to other XModule instances. It includes a relativePath field that is conceptually the same as the relativePath link type.

| Field | Type | Description |
| --- | --- | --- |
| id | string | The id (or path) of the XModule to link to. |
| relativePath | string | Used for deep linking to a page in another XModule instance; if not specified this will default to the XModule web service's base URL. |

Example JSON produced by a web service for a link element of type "xmodule" is as follows:

```
"link": {
  "xmodule": {
    "id": "another_xmodule",
    "relativePath": "/detail"
  }
}
```

A "form" element contains other form user interface elements, such as radio buttons, text fields, checkboxes, submit buttons and other elements used in a form.

| Field | Type | Description |
| --- | --- | --- |
| elementType | string | For a form element this field is "form". |
| postRelativePath | string | Indicates the URL to which the XModule should post form inputs. |
| heading | string | A heading that is displayed above the form items. |
| items | array | A container for other form elements; may contain non-form user interface elements as well. |

Example JSON produced by a web service for an empty "form" element is as follows:

```
{
  "metadata": {
    "version": "1"
  },
  "content": [
    {
      "elementType": "form",
      "postRelativePath": "form_receipt/",
      "items": [
      ]
    }
  ]
}
```

A "formButton" element is a button that performs a form action. As noted above, button elements are wrapped in buttonContainers.

| Field | Type | Description |
| --- | --- | --- |
| elementType | string | For a form button element this field is "formButton". |
| title | string | The text displayed within the button. |
| name | string | The name of the form button to be passed as part of a form submission. |
| buttonType | string | Two possible values: "submit" or "reset"; the "submit" type will result in a form submission; the "reset" type will reset any form inputs to their initial values; defaults to "submit". |
| accessoryIcon | string | An icon that indicates the action that the button performs; the icon can be one of the following values: "drilldown", "phone", "sms", "comment", "email", "email_open", "reply", "calendar", "people", "map", "secure", "unlock", "external", "attachment", "download", "upload", "camera", "print", "favorite", "bookmark", "share", "rotate", "plus", "minus", "button_add", "button_remove", "flag", "delete", "reset", "reload", "like", "unlike", "checkbox", "checkbox_on"; defaults to null. |
| accessoryIconPosition | string | If an "accessoryIcon" is set, this field controls the relative positioning of the icon; allowed values are "left" and "right"; defaults to "left". |
| actionType | string | Sets the style of the button to indicate what kind of action it performs; allowed values are "constructive", "destructive", and "emphasized". |

Form elements can include various input items, such as text fields, password fields, radio buttons, checkboxes, drop-down lists, and other user interface components. As one example, the fields for a text input are as follows.

| Field | Type | Description |
| --- | --- | --- |
| elementType | string | For an input type element, this field is "input". |
| inputType | string | For a text input this field is "text". |
| name | string | The name of the input field to be passed in a form submission. |
| label | string | A label to indicate what the user should input. |
| description | string appears | A description for providing further information that beneath the input field. |
| value | string | When set will pre-populate the input field with the value; defaults to null. |
| placeholder | string | Used to display a short hint within the input field; defaults to null. |
| required | boolean | Indicates whether the user must enter a value to the input field in order to submit the form; defaults to false. |

Example JSON produced by a web service for a "form" element with text inputs and a submit form button is as follows:

```
{
  "elementType": "form",
  "postRelativePath": "form_receipt/,
  "items": [
    {
      "elementType": "input",
      "inputType": "text",
      "name": "text_input_1",
      "label": "Text Label",
      "description": "Text Description",
      "required": true,
      "placeholder": "Placeholder Text"
    },
    {
      "elementType": "input",
      "inputType": "text",
      "name": "text_input_2",
      "label": "Text Label",
      "value": "Default Value"
    },
```

```
    {
      "elementType": "buttonContainer",
      "buttons": [
        {
          "elementType": "formButton",
          "title": "Submit",
          "buttonType": "submit"
        }
      ]
    }
  ]
}
```

In one implementation, the base URL of a web service acts as the index page of the XModule that is configured to query the web service URL. To create multiple pages within a single XModule, the web service can provide different sets of user interface elements based on different paths or parameters in the web service URL. For instance, the URL, https://api.example.com, can return the following JSON as the index page:

```
{
  "metadata": {
    "version": "1"
  },
  "content": [
    {
      "elementType": "detail",
      "title": "This is the index page",
      "content": [ ]
    }
  ]
}
```

To create a different page, the web service can return different user interface elements when a path or query parameter is appended to the base URL. The XModule will then render the returned data from the web service as a separate page. For example, the URL, https://api.example.com/path?param=newpage, can return the following JSON instead of an index page:

```
{
  "metadata": {
    "version": "1"
  },
  "content": [
    {
      "elementType": "detail",
      "title": "This is a different page",
      "content": [ ]
    }
  ]
}
```

To configure the XModule to enable navigation from one page to another, the web service can return a link item in the first page that sets the relative path for the next page. For example, the index page of the module, returned by https://api.example.com, can have the following elements:

```
{
  "metadata": {
    "version": "1"
  },
```

```
  "content": [
    {
      "elementType": "detail",
      "title": "This is the index page",
      "content": [
        {
          "elementType": "list",
          "grouped": true,
          "items": [
            {
              "title": "A link to another page",
              "link": {
                "relativePath":
                "/path?p=new"
              }
            }
          ]
        }
      ]
    }
  ]
}
```

When a user interacts with the link item in an application user interface, the XModule automatically appends the relativePath value to the base URL, in this case creating https://api.example.com/path?p=new. When the XModule makes a request to this URL, the web service returns a different page.

In another implementation, an XModule provides the capability to perform redirects to pages that are internal or external to the platform providing the XModule. Because the redirect itself (HTTP 302 status code) does not have a user interface component, the root "content" field is not required in the JSON response from the web service. Instead, the service returns the root "metadata" field, containing a "redirectLink" object, such as in the following example JSON code:

```
{
  "metadata": {
    "version": "1",
    "redirectLink":
    {
      "external": "http://www.example.com"
    }
  }
}
```

While the above example uses a static link, the web service can instead return a dynamic link based on the user data that XModule provides to the web service via, for example, a JWT token (further described below). For instance, a user ID value can be used to construct and return a link that is specific to the user (e.g., a link to the user's account information in an external system). Deep linking into external sites is advantageous when both sites are behind the same single sign-on ("SSO"), such that there is no need to sign in a second time. When an external site is not behind an SSO, a login token can be constructed to append to the redirect link's URL, although this is dependent on the external site's capabilities.

As described above, XModules can render form elements and provide form submission functionality. Data entered into a form rendered by an XModule can be submitted to a web service URL associated with the XModule or some other URL. In one implementation, to support form submissions, the web service implements the following sequence of HTTP-based API requests and responses:

| Step | Request Method | Sample URL | Response |
|---|---|---|---|
| 1 | GET | /form | The form. |
| 2 | POST | /form | A redirect to the form receipt. |
| 3 | GET | /receipt | The receipt. |

In Step 1, the web service returns a "form" element containing one or more form input elements as well as a submit button. The form element specifies a "postRelativePath"; this field instructs the XModule to which URL it should POST the user's submitted values. Assuming the web service's base URL is https://api.example.com/form, an example GET form from the web service results in the following:

```
{
  "metadata": {
    "version": "1"
  },
  "content": [
    {
      "elementType": "form",
      "postRelativePath": "",
      "items": [
        {
          "elementType": "input",
          "inputType": "text",
          "name": "user_name",
          "label": "Please enter your name",
          "required": true
        },
        {
          "elementType": "buttonContainer",
          "buttons": [
            {
              "elementType": "formButton",
              "title": "Submit",
              "buttonType": "submit"
            }
          ]
        }
      ]
    }
  ]
}
```

In Step 2, when the form is submitted, the XModule uses the "postRelativePath" of the form to determine the URL to which the XModule will POST the user's submitted values. In this example, the "postRelativePath" is an empty string, so the XModule uses the same base URL (https://api.example.com/form) to POST the values. If, for instance, the user submits their name as John Smith, then the XModule makes the following request to the web service.

POST/form HTTP/1.1
Host: api.example.com
Authorization: Bearer <token>
user_name=John %20Smith The web service processes the submitted values and responds to the XModule with a "redirectLink", as described above. The redirect is used to prevent duplicate POSTs in the event that users browse backward after submission. Assume, for example, that the above POST request results in the web service returning the following:

```
{
  "metadata": {
    "version":"1",
    "redirectLink": {
      "relativePath":
      "./form_receipt?transaction_id=Sm9obiUyMFNtaXRo"
    }
  }
}
```

The redirectLink in this response instructs the XModule to make a subsequent GET request to https://api.example.com/form_receipt?transaction_id=Sm9obiUyMFNtaXRo, which will return the final page's content in the sequence. Note that this example includes a transaction_id parameter as a means for looking up the receipt values in Step 3; however, the need for a transaction id can depend upon the implementation.

For Step 3, the receipt page returns the content that should be displayed to the user following the form submission. In some cases, this is an updated version of the original form, in which case the redirect can instruct the XModule to return to the web service's base URL instead of a distinct receipt page. For example, assume the web service's receipt is located at https://api.example.com/form_receipt?transaction_id=Sm9obiUyMFNtaXRo In this scenario the web service uses the transaction_id to look up the receipt values (again, the need for this parameter may depend upon the implementation), and then returns the following content:

```
{
  "metadata": {
    "version":"1",
  }
  "content": [
    {
      "elementType": "html", "html":
      "Hello John Smith!"
    }
  ]
}
```

In some implementations, an authentication technique is used to form a trusted relationship between an XModule and its associated web service. In one example, JSON Web Tokens ("JWT") are used for such authentication. JWT, defined in RFC 7519, can be used to create access tokens that an XModule sends in an HTTP header with each request to the web service. The web service can then use JWT in order to verify that these requests are from a trusted party. The trusted relationship between the XModule and the web service can be established via a shared secret or public/private keys, for example.

A JWT token includes three components: (1) header, (2) payload, and (3) signature. The header contains an "alg" attribute, which refers to the algorithm used to create the token's signature. Its value will be, for example, "HS256" when using a shared secret or "RS256" when using public/private keys. The web service can verify that the "alg" matches the type that the associated XModule has been configured to send. The payload contains an "exp" attribute that indicates an expiration time, which the web service can use to determine whether the token is still valid. The payload also contains an "iat" (issued at time) attribute, which can be used to implement alternative policies if desired. Other information may also be provided in the payload, such as a username and information about the end user's device. For example, in one implementation, an XModule can provide a logged-in user's ID to the web service via the JWT token's "sub" (subject) field. This enables the web service to look up and return user-specific content. To prevent unauthorized parties from accessing this content, the web service can verify that the JWT token's signature is valid and has not expired. When the token is constructed, the header and payload are Base64 URL encoded and then concatenated into a single string using a dot-separated structure. The signature is generated from this initial string and then is itself Base64 URL encoded and appended to the string as well.

As noted above, various types of information can be included in the payload of the JWT token (or provides to the web services via other techniques). For example, the token can be user to transfer metadata about a user (e.g., a user id and other user attributes), the user's device (e.g., the platform/OS), and the interface module itself (e.g., the context in which the module's content is being displayed). In one implementation, an XModule can return any of the below attributes specific to the user or the user's device. These attributes can be used to create specific content and experiences depending on different information about the user and/or their device. For instance, it may be desirable to layout content differently for large versus small screens.

In one implementation, XModule supports the use of Asynchronous JavaScript and XML ("AJAX") to alleviate performance costs when fetching certain content, for example, when looking up user-specific content or retrieving content from multiple sources to display in a single screen. XModule can use AJAX for asynchronous loading of certain fields within user interface elements. For instance, the list user interface element can support AJAX loading for the "items" field, and the portlet user interface element can support AJAX loading for the "content" field. Where AJAX loading is used, the content that would normally be returned within an AJAX-supported field is substituted with a JSON object containing an "ajaxRelativePath" field of type "string." The path is appended to the base URL of the web service, and causes the XModule to retrieve a subset of the page's content from a different URL via a separate AJAX request to the web service. Instead of returning the AJAX-retrieved content in a root "content" field, the web service return the content in a "regionContent" of type "array", representing the content of a specific region of the page.

One example of the foregoing is as follows, in which the Base URL is https://api.example.com/list/and the AJAX URL is https://api.example.com/list/items/. In this example, the XModule initially makes a request to the external web service using the base URL, which returns the page content.

| Attribute | Description | Possible values |
| --- | --- | --- |
| "pagetype" | Refers to the size of the device. Desktop/tablet devices are generally categorized as "large", while most smartphones are "small". There is also a legacy "text" type that is returned for feature phones and other older devices; for these cases it is typically safe to return the same content that is returned to "small". | "large", "small", "text" |
| "platform" | Used to delineate between requests from iOS, Android, and other sources (including monitoring tools and site crawlers). | "computer", "ios", "ios6", "android", "winphone8", "monitor", "spider", "unknown" |
| "browser" | Refers to the browser-type that is displaying the XModule content. The "native" value will be returned when a user is viewing content from a native app rather than a traditional browser. | "native", "chrome", "safari", "firefox", "ie", "editpreview", "unknown" |
| "environment" | Refers to the server-side environment that the user's device is accessing. Can be used to facilitate debugging by returning different error messages in non-production vs. "production" environments. | "test", "edit", "production", "dev" |
| "persona" | Refers to the persona that the user is accessing in the application supporting the XModules | Returns the persona identifer. |
| "persona_timezone_name" | Refers to the persona's time zone. | Returns time zone data values (e.g., "America/New_York"). |
| "persona_timezone_offset" | Refers to the persona's time zone. | Returns time zone offset in seconds. |

```
{
  "metadata": {
    "version": "1"
  },
  "content": [
    {
      "elementType": "list",
      "grouped": true,
      "heading": "Example heading",
      "items": {
        "ajaxRelativePath": "items/"
      }
    }
  ]
}
```

Because "items" returns an object containing an "ajaxRelativePath" (instead of the actual items), the XModule makes a subsequent AJAX request to the web service by using the AJAX URL. The service then returns the "items" content in a root "regionContent" field, as shown below.

```
{
  "metadata": {
    "version": "1"
  },
  "regionContent": [
    {
      "label": "Example label",
      "title": "Example title",
      "description": "Example description"
    },
    {
      "title": "Example title with link",
      "link": {
        "relativePath": "?page=example_link",
        "accessoryIcon": "plus"
      },
      "thumbnail": {
        "url": "http://static.modolabs.com/services/modo.png",
        "maxWidth": 43,
        "maxHeight": 43,
        "crop": true,
        "alt": "Modo Labs"
      }
    }
  ]
}
```

In one implementation, when an end user accesses this page, they will experience an initial page load that includes a temporary loading spinner until the AJAXe content is retrieved and displayed.

An AJAX example using the portlet element will now be described. For this example, the base URL is https://api.example.com/portlet/, and it returns the following JSON:

```
{
  "metadata": {
    "version": "1"
  },
  "content": [
    {
      "elementType": "portlet",
      "navbarTitle": "Portlet Title",
      "navbarIcon": "fullweb",
      "navbarLink": {
        "external": "http://www.google.com",
        "accessoryIcon": "external"
      },
```

```
      "content": {
        "ajaxRelativePath": "content/"
      }
    }
  ]
}
```

In this case the "ajaxRelativePath" is used to construct the URL, https://api.example.com/portlet/content/, which returns the following:

```
{
  "metadata": {
    "version": "1"
  },
  "regionContent": [
    {
      "elementType": "html",
      "html": "Hi there!"
    }
  ]
}
```

Again, in some instances, when the end user first loads the screen, they will see a loading spinner before the AJAX content is loaded.

In one implementation, a user interface of a platform application can include various user interface components that are configured manually or generated in some other manner. Further, the user interface can include components that contain one or more dynamic user interface modules that provide XModule-based content. Such modules, referred to herein as XComponents, allow for specific subsets of XModule elements to be incorporated as individual features in an existing platform application. For example, as further described below, XComponents can be included in Mondrian, collage, and card navigation user interface templates. Such XComponents can represent tiles, cards, blocks, and similar user interface components, as well as carousel versions of the same. XComponents can also be used in portlets and added to the header and/or footer areas of screens in other modules. A JSON response from a web service can be used to populate the elements of XComponent content, as described above with respect to XModules.

An XComponent can be used in various sizes of Mondrian tiles in a tile user interface layout, such as 1×1, 1×2, 1×3, 2×2, 2×3, and so on. Fields used to define a Mondrian tile include the following:

| Field | Type | Description |
|---|---|---|
| elementType | string | For a Mondrian tile this field is "publish:mondrian:contentTile". |
| background | object | An object specifying the background image URL. |
| foreground | object | If provided, will display a foreground image at the specified URL. |
| subtitle | string | A subtitle that is displayed beneath the title. |
| title | string | A title that is displayed below the foreground image (if provided). |
| link | object | Setting this field turns the item into a link. |

Figures 6, 7:
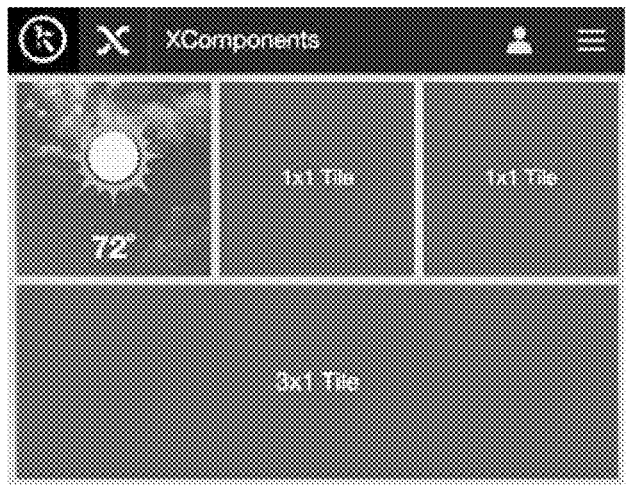
FIG. 6 depicts an example Mondrian interface layout including a dynamic user interface module component.
FIG. 7 depicts an example collage interface layout including a dynamic user interface module component.

An example JSON response to populate a 1×1 Mondrian tile displaying a weather status (foreground image of a sun over a sky background, with a title of "72 degrees"), as shown in FIG. 6, is as follows:

```
{
  "elementType": "publish:mondrian:contentTile",
  "title": "72 Degrees",
```

```
"foreground": {
    "alt": "An image of the sun",
    "url": "https://static.m.com/xmodule/images/sun.png"
},
"background": {
    "url": "https://static.m.com/xmodule/images/sky.jpg"
},
"link": {
    "external":             "https://weather.wth/
        MapClick.php?lat=x&lon=-y"
}
}
```

In another implementation, an XComponent can form part of a collage user interface layout. For example, a collage XComponent block can form a container that renders an XModule web service response and supports a subset of XModule elements, such as list, image, linkButton, portlet, and others. Example JSON used in rendering an XComponent collage block for a student class schedule using list elements, as shown in FIG. 7, is as follows:

```
{
    "elementType": "list",
    "grouped": true,
    "heading": "Monday, April 2",
    "items": [
        {
            "title": "Accountancy I",
            "description": "8:30-9:20am @ Mendoza 161",
            "label": "ACCT20100-01",
            "link": {
                "xmodule": {
                    "id": "catalog",
                    "relativePath": "/ACCT20100-01"
                }
            }
        },
        {
            "title": "Design Research Practices",
            "description": "9:30-10:20am @ Riley 200",
            "label": "DESN20204-01",
            "link": {
                "xmodule": {
                    "id": "catalog",
                    "relativePath": "/DESN20204-01"
                }
            }
        }
    ]
},
{
    "elementType": "list",
    "grouped": true,
    "heading": "Wednesday, April 4",
    "items": [
        {
            "title": "Modern Literature in Irish",
            "description": "11:00am-12:15pm @
                O'Shaughnessy 202",
            "label": "IRST20118-06",
            "link": {
                "xmodule": {
                    "id": "catalog",
                    "relativePath": "/IRST20118-06"
                }
            }
        }
    ]
}
```

In another implementation, an XComponent can form part of a card navigation user interface layout. XComponent content cards can be defined similarly as described with respect to tiles and blocks, above. One will appreciate the various uses for such carousel cards, including, for example, as interactive user interface components depicting news, videos, photos, social media elements, and calendars. With respect to the fields for defining a card carousel, the "elementType" is defined as "publish:cardnav:carousel", and an container array of items defines the particular carouselItem objects to be displayed within the carousel card. In one implementation, a carouselItem includes one or more of the following fields:

| Field | Type | Description |
| --- | --- | --- |
| image | object | An object specifying the URL of an image. |
| subtitle | string | A subtitle that is displayed beneath the title. |
| title | string | A title that is displayed over or beside the image. |
| link | object | Setting this field turns the item into a link. |

Figure 8:
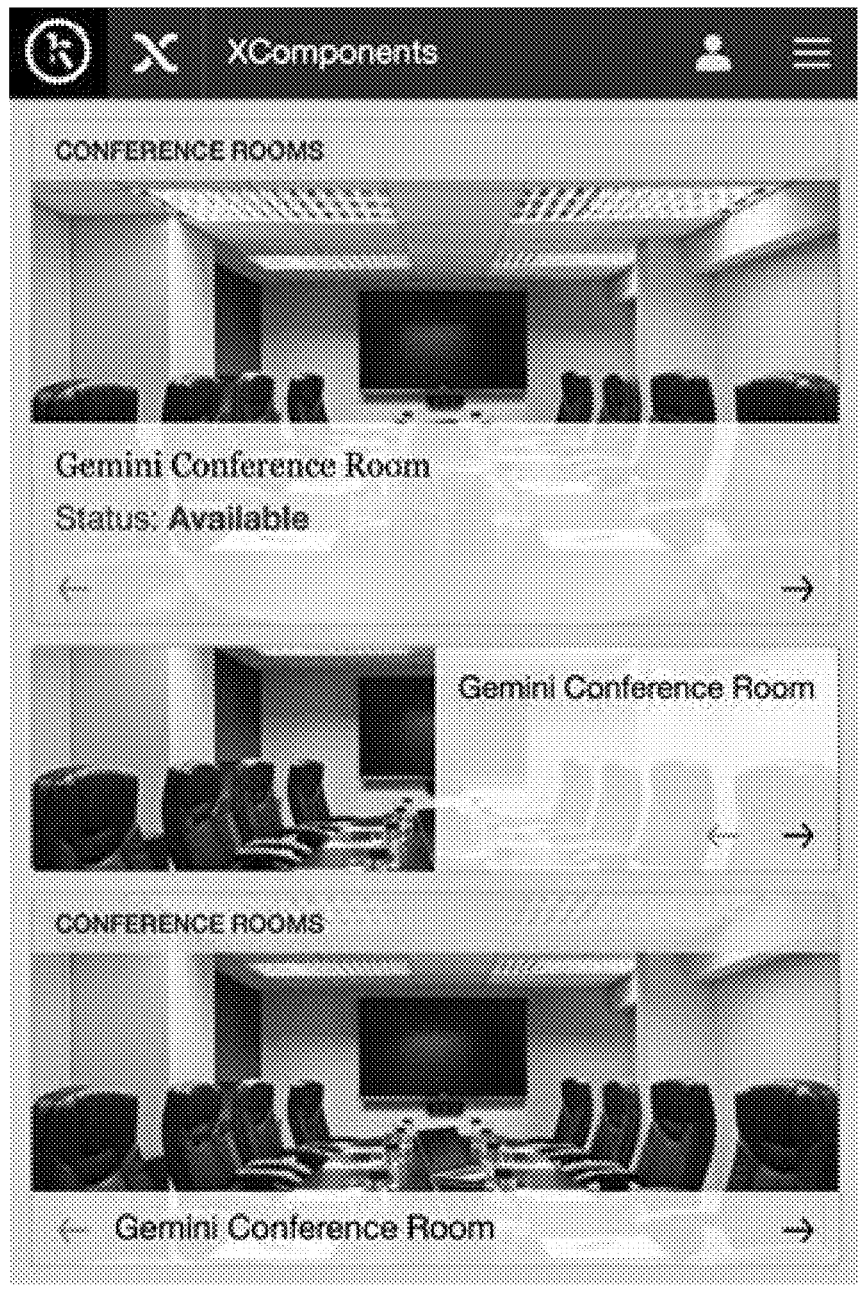
FIG. 8 depicts an example card carousel interface layout including a dynamic user interface module component.

An example JSON response from a web service that can be used to populate an XComponent carousel card for a conference room scheduling interface, as shown in FIG. 8, is as follows:

```
{
    "elementType": "publish:cardnav:carousel",
    "items": [
        {
            "title": "Gemini Conference Room",
            "subtitle": "Status: <strong>Available</strong><br />Next
                reservation: 8:00am tomorrow",
            "image": {
                "url": "http://m.com/conference-bright.jpg"
            },
            "link": {
                "xmodule": {
                    "id": "reserve_a_room",
                    "relativePath": "?room=gemini"
                }
            }
        },
        {
            "title": "Mercury Conference Room",
            "subtitle": "Status: <strong>Occupied</strong><br />Next
                availability: 3:00-4:00pm today",
            "image": {
                "url": "http://s.com/conference-2-bright.jpg"
            },
            "link": {
                "xmodule": {
                    "id": "reserve_a_room",
                    "relativePath": "?room=mercury"
                }
            }
        },
        {
            "title": "Saturn Boardroom",
            "subtitle": "Status: <strong>Available</strong><br />Next
                reservation: 9:00am-11:00am Thursday",
            "image": {
                "url": "http://s.com/boardroom-bright.jpg"
            },
            "link": {
                "xmodule": {
                    "id": "reserve_a_room",
                    "relativePath": "?room=saturn"
                }
            }
        }
    ]
}
```

Figure 9:
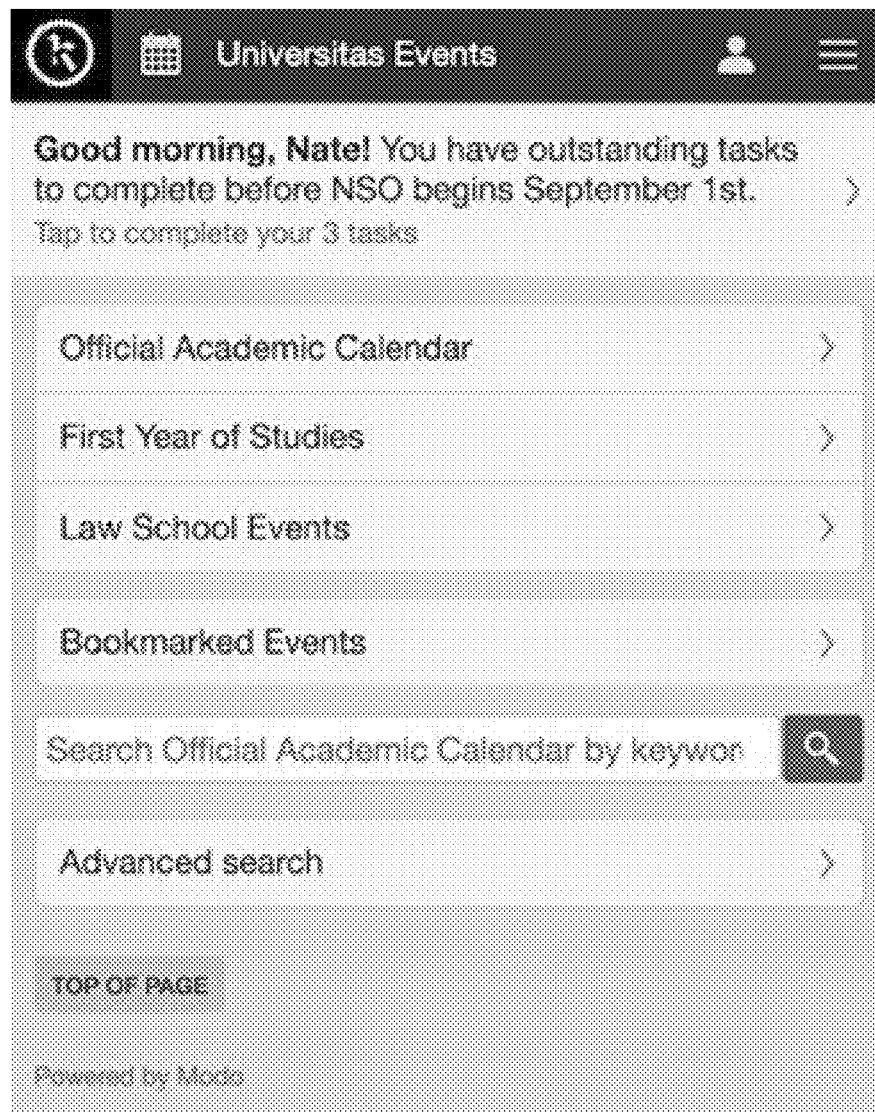
FIG. 9 depicts an example application screen including a dynamic user interface module component in the header.

In some implementations, XComponents can be used within the header or footer section of a user interface module of an application platform, such as that described herein. Similar to collage blocks, header/footer XComponents are containers for supported XModule elements. In one instance, a header or footer supports a single XModule element in the root "content" array, although multiple elements can be supported in other implementations. Supported elements in XComponent headers and footers can include lists, images, portlets, and HTML declarations, among others. Example JSON returned by a web service for an XComponent header with list element, as shown in FIG. 9, is as follows:

```
{
  "elementType": "list",
  "items": [
    {
      "title": "<strong>Good morning, Nate!</strong>You have
      outstanding tasks to complete before NSO begins September 1st.",
      "description": "Tap to complete your 3 tasks",
      "link": {
        "accessoryIcon": "drilldown",
        "relativePath": "? page=example_link"
      }
    }
  ]
}
```

In further implementations, XModules are used to facilitate other aspects of the user experience where XModule itself may or may not perform any rendering of user interfaces. For example, the "external" link type and "redirectLink" object described above can be used to facilitate dynamically generated deep links into third party sites and applications, rather than specify an internal link within a platform application or other XModule. XModules can also be used to facilitate access to or invocation of capabilities of the underlying operating system, for instance, sensor data (e.g., geolocation, accelerometer, etc.), or other applications that expose capabilities through the operating system (e.g., payment applications such as Apple® Wallet). In such instances, metadata can be delivered to/from the web service, or mechanisms for the web service can be used to invoke, via an XModule, user interfaces generated by third party software.

Components of the systems described herein can utilize appropriate hardware or software and can execute, for example, on a system capable of running a server-class, desktop, or mobile operating system such as the Microsoft Windows® operating systems, the Apple OS X® operating systems, the Apple iOS® platform, the Google Android™ platform, the Linux® operating system and other variants of UNIX® operating systems, and the like. Some or all of the described functionality can be performed remotely, in the cloud, or via software-as-a-service.

The system include any suitable software and/or hardware, and can include or operate on a smart phone, feature phone, smart watch, smart glasses, tablet computer, portable computer, television, gaming device, music player, mobile telephone, desktop computer, laptop, palmtop, smart or dumb terminal, network computer, personal digital assistant, wireless device, information appliance, workstation, minicomputer, mainframe computer, or other computing device, that is operated as a general purpose computer or a special purpose hardware device that can execute the functionality described herein. The software, for example, can be implemented on a general purpose computing device in the form of a computer including a processing unit, a system memory, and a system bus that couples various system components including the system memory to the processing unit.

The system can include a plurality of software processing modules stored in a memory and executed on a processor. By way of illustration, the program modules can be in the form of one or more suitable programming languages, which are converted to machine language or object code to allow the processor or processors to execute the instructions. The software can be in the form of a standalone application, implemented in a suitable programming language or framework.

Method steps of the techniques described herein can be performed by one or more programmable processors executing one or more computer programs to perform functions by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

In various implementations, a user device includes a web browser, native application, or both, that facilitates execution of the functionality described herein. A web browser allows the device to request a web page or other program, applet, document, or resource with an HTTP request. One example of a web page is a data file that includes computer executable or interpretable information, graphics, sound, text, and/or video, that can be displayed, executed, played, processed, streamed, and/or stored and that can contain links, or pointers, to other web pages. In one implementation, a user of a device manually requests a resource from a server. Alternatively, the device automatically makes requests with a browser or native application. Examples of commercially available web browser software include Google Chrome®, Microsoft Internet Explorer®, Mozilla Firefox®, and Apple Safari®.

A communications network can connect devices, back-end systems and servers directly or indirectly with each other. The communication can take place over media such as standard telephone lines, LAN or WAN links (e.g., T1, T3, 56 kb, X.25), broadband connections (ISDN, Frame Relay, ATM), wireless links (802.11 (Wi-Fi), Bluetooth, GSM, CDMA, etc.), for example. Other communication media are possible. The network can carry TCP/IP protocol communications, and HTTP/HTTPS requests made by a web browser or native application and the connections can be communicated over such TCP/IP networks. Other communication protocols are possible.

The system can also be practiced in distributed computing environments where tasks are performed by remote processing devices that are linked through a communications network. In a distributed computing environment, program modules can be located in both local and remote computer storage media including memory storage devices. Other types of system hardware and software than that described herein can also be used, depending on the capacity of the device and the amount of required data processing capability. The system can also be implemented on one or more virtual machines executing virtualized operating systems such as those mentioned above, and that operate on one or more computers having hardware such as that described herein.

It should also be noted that implementations of the systems and methods can be provided as one or more computer-readable programs embodied on or in one or more articles of manufacture. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention. The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

The invention claimed is:

1. A computer-implemented method comprising:
providing a specification that defines a format for declaring data to be displayed within a plurality of user interface elements;
receiving by a dynamic user interface module, through a web service programmed to conform to the specification, one or more objects declaring instances of one or more of the user interface elements, wherein the web service comprises an application programming interface over a web protocol, and wherein the receiving comprises:
configuring the dynamic user interface module to query the web service using the web protocol to request the one or more objects; and
forming a trusted relationship between the dynamic user interface module and the web service by including a token in one or more queries made to the web service by the dynamic user interface module, wherein the token comprises (i) authentication data and (ii) metadata comprising information associated with a user, a device of the user, and/or the dynamic user interface module; and
rendering for display to a user by the dynamic user interface module, based on the received one or more objects, the instances of the one or more user interface elements.

2. The method of claim 1, further comprising configuring the dynamic user interface module to communicate with the web service via a specified uniform resource locator.

3. The method of claim 1, further comprising querying, by the dynamic user module, the web service using an HTTP request.

4. The method of claim 3, further comprising receiving from the web service, in response to the HTTP request, an HTTP response comprising the one or more objects.

5. The method of claim 1, wherein the dynamic user interface module comprises a standalone application executing on an underlying platform.

6. The method of claim 1, wherein the dynamic user interface module comprises a user interface module disposed within a separate application executing on an underlying platform.

7. The method of claim 6, wherein the dynamic user interface module is disposed within one or more components of a user interface on a screen of the separate application.

8. The method of claim 1, wherein the one or more objects comprise JavaScript Object Notation objects.

9. The method of claim 1, wherein each object includes one or more fields of one of the user interface elements, and wherein rendering the instances comprises configuring properties of the instances of the user interface elements based on the fields.

10. The method of claim 1, wherein at least one of the objects received by the dynamic user interface module through the web service is defined based on the metadata.

11. A system comprising:
a processor; and
a memory storing computer-executable instructions that, when executed by the processor, program the processor to perform the operations of:
receiving by a dynamic user interface module, through a web service programmed to conform to the specification, one or more objects declaring instances of one or more of the user interface elements, wherein the web service comprises an application programming interface over a web protocol, and wherein the receiving comprises:
configuring the dynamic user interface module to query the web service using the web protocol to request the one or more objects; and
forming a trusted relationship between the dynamic user interface module and the web service by including a token in one or more queries made to the web service by the dynamic user interface module, wherein the token comprises (i) authentication data and (ii) metadata comprising information associated with a user, a device of the user, and/or the dynamic user interface module; and rendering for display to a user by the dynamic user interface module, based on the received one or more objects, the instances of the one or more user interface elements.

12. The system of claim 11, wherein the operations further comprise configuring the dynamic user interface module to communicate with the web service via a specified uniform resource locator.

13. The system of claim 11, wherein the operations further comprise querying, by the dynamic user module, the web service using an HTTP request.

14. The system of claim 13, wherein the operations further comprise receiving from the web service, in response to the HTTP request, an HTTP response comprising the one or more objects.

15. The system of claim 11, wherein the dynamic user interface module comprises a standalone application executing on an underlying platform.

16. The system of claim 11, wherein the dynamic user interface module comprises a user interface module disposed within a separate application executing on an underlying platform.

17. The system of claim 16, wherein the dynamic user interface module is disposed within one or more components of a user interface on a screen of the separate application.

18. The system of claim 11, wherein the one or more objects comprise JavaScript Object Notation objects.

19. The system of claim 11, wherein each object includes one or more fields of one of the user interface elements, and wherein rendering the instances comprises configuring properties of the instances of the user interface elements based on the fields.

20. The system of claim 11, wherein at least one of the objects received by the dynamic user interface module through the web service is defined based on the metadata.

* * * * *